United States Patent Office 2,900,557
Patented Aug. 18, 1959

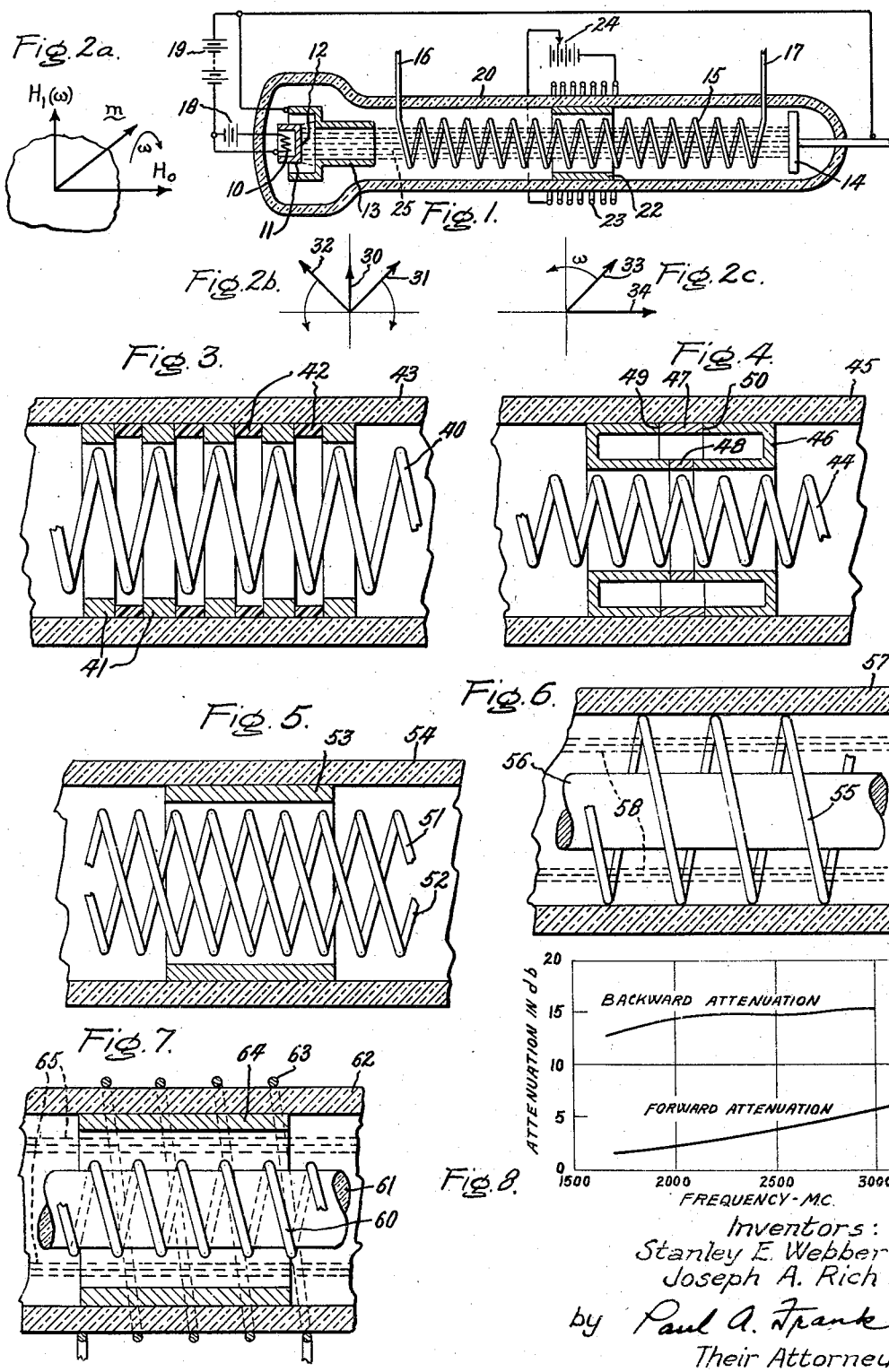

2,900,557

TRAVELING WAVE DIRECTIONAL ATTENUATOR

Stanley E. Webber and Joseph A. Rich, Schenectady, N.Y., assignors to General Electric Company, a corporation of New York Application August 26, 1954, Serial No. 452,245

1 Claim. (Cl. 315—3.5)

This invention relates to improvements in directional attenuators. While this invention is subject to a wide range of applications, it is especially suited for use in a traveling wave interaction device such as a helical traveling wave tube amplifier and will be particularly described in that connection.

In traveling wave interaction devices where energy is exchanged between an electron stream and a propagated wave, the average velocity of the electron stream is usually somewhat greater than that of the propagated wave so that energy is transferred to the propagated wave from the electron stream. The structure which transmits the traveling wave may consist of a helical conductor on which the velocity of the wave along the axis of the helix is substantially less than the actual velocity along the helix conductor and in the vicinity of conveniently obtainable electron beam velocities. While such traveling wave amplifiers are characterized by their broad band application, the difficulty of terminating such structures for a wide band of frequencies results in a substantial reflected component which, upon re-reflection, may cause oscillation.

To prevent such oscillation and to counteract the inherent instability in traveling wave interaction devices, various means for attenuating the backward traveling wave have been employed. Such means usually comprise a conductive or semiconductive means positioned along the traveling wave path to absorb some of the wave energy. Devices of this type tend to reduce the gain, efficiency, and power output of the traveling wave interaction device due to their substantially similar interaction with the forward traveling wave as well as the undesired backward traveling wave.

It is, therefore, an object of this invention to provide a traveling wave interaction device having an improved appartus for stabilizing its operation.

It is a further object of this invention to provide a method and apparatus for absorbing a large portion of the energy associated with a backward traveling electromagnetic wave in a traveling wave interaction device and for absorbing a relatively small portion of the energy associated with a forward traveling electromagnetic wave.

It is another object of this invention to provide a traveling wave interaction device having increased power output, gain and efficiency.

A further object of this invention is to provide an improved substantially unidirectional attenuating structure.

According to one aspect of this invention, the backward traveling wave of a traveling wave interaction device is highly attenuated by resonance absorption of the wave energy by ferromagnetic material in an attenuator structure while, due to the orientation of the magnetic fields associated with the traveling wave structure, the forward traveling wave is little affected by the attenuator structure.

An example of a specific embodiment of this invention provides a static unidirectional magnetic field which is substantially parallel to the direction of wave propagation along a helical structure. The time varying magnetic field established by an electromagnetic wave propagated along this helical structure includes a circularly polarized component, the direction of rotation of which reverses when the direction of propagation of a traveling wave on the helix is reversed. An attenuator structure including ferromagnetic material is oriented in proximity to the helix. The resonance absorption characteristics of the ferromagnetic material when placed in the vicinity of these fields is such that a large portion of the energy associated with one direction of circular polarization of the magnetic field is absorbed by the ferromagnetic material while only a small portion of the energy associated with the opposite direction of rotation of circular polarization is absorbed.

The features which it is desired to protect herein are pointed out with particularity in the appended claims. The invention itself together with further objects and advantages thereof, may best be understood by reference to the following description taken in connection with the drawings in which Figure 1 illustrates a traveling wave interaction device utilizing a helical slow wave structure and incorporating a directional attenuator in accordance with this invention; Figures 2a–2c illustrate basic concepts useful in obtaining an understanding of this invention; Figures 3 through 7 inclusive illustrate specific adaptations of the attenuator of this invention to traveling wave interaction devices; and Figure 8 illustrates attenuating characteristics of an embodiment of this invention.

While an attenuator in accordance with this invention may utilize any compound or material in which a magnetic resonance effect may be observed and is considered to include utilization of ferromagnetic materials composed of elements from or combinations of the ferromagnetic elements iron, cobalt and nickel, it will be particularly described in connection with the general class of ferromagnetic materials defined as ferrites which are represented by the chemical formula $MOFe_2O_3$ where M is a divalent metal ion such as Mn, Co, Ni, Cu, Mg, Zn, Cd or a mixture of these.

Figure 1 illustrates by way of example a typical traveling wave interaction device commonly termed a helical traveling wave amplifier. This amplifier is provided with an electron gun structure consisting of heater 10, cathode 11 with thermionic emitting surface 12 and a focusing and accelerating electrode 13. Electrons emitted by the electron gun are directed to collector plate 14. A helix member 15, which may be made for example of copper wire, has input lead 16 and output lead 17. Heater current for the electron gun is supplied by power source 18 and accelerating and collecting potentials are provided by power source 19, the voltage of which may be varied. Heater 10 is connected to cathode 11 and to the low potential end of power source 19. The high potential end of power source 19 is connected to the accelerating electrode 13 and to the collector electrode 14 and is customarily grounded. The electron gun, the helix 15 and the collector 14 are sealed into an evacuated envelope such as glass envelope 20 and the various electrical leads are brought through the glass envelope 20 and hermetically sealed thereto by any satisfactory glass-to-metal sealing means. A magnetic field in the direction of the electron stream 25 is generally provided to focus the electron stream but is omitted from this illustration in order to simplify the illustration and description of this invention.

An attenuator 22 which includes ferromagnetic material is enclosed within the envelope and acts as a directional attenuator in a manner which will be more completely described hereinafter. A solenoid 23 coupled across adjustable power supply 24 provides a unidirectional magnetic field substantially parallel to the axis of the helix in the region of the attenuator 22.

In accordance with the conventional practice in the use of helical traveling wave amplifiers, the ratio of the pitch to the diameter of the helix 15 and the electron accelerating potential provided by power source 19 are so related that energy is transferred from the stream to a wave traveling along the helix. As is known in the art, the adjustment is commonly such that the velocity of electrons in the stream is somewhat greater than that of at least one component of the traveling electromagnetic wave which may be coupled to the helix by means of leads 16 and 17. Under these conditions, it is known that interaction between the stream and the wave occurs to amplify the electromagnetic wave as it travels along the helix. One explanation of this interaction may be obtained from a publication by J. R. Pierce which may be found in the Bell System Technical Journal, vol. 29, No. 1 (January 1950), pages 6 to 19. The energy exchange is available at several electron stream velocities, and the velocity chosen depends upon a number of factors, including the magnitude of the stream current.

In accordance with this invention, oscillation in or instability of a traveling wave interaction device, such as the amplifier illustrated in Figure 1, is frequently due to the reflection of waves from the output end of the helix which travel in a backward direction from the output toward the input end. Attenuator 22 in accordance with this invention highly attenuates electromagnetic wave energy traveling in a backward direction along the helix 15.

A static unidirectional magnetic field substantially parallel to the direction of wave propagation along the helix 15 is provided by the solenoid 23 and power supply 24. As will be more completely described hereinafter, the magnetic field established by an electromagnetic wave propagated along helix 15 is elliptically polarized and therefore includes a circularly polarized component, the direction of rotation of which reverses when the direction of propagation of an electromagnetic wave on the helical structure is reversed. Therefore, a forward traveling electromagnetic wave will have a given direction of rotation of the circularly polarized component of the associated magnetic field and the backward traveling wave will have an oppositely rotating component of the circularly polarized magnetic field. The resonance characteristics of ferromagnetic material such as that in attenuator 22, when placed in the vicinity of these fields, is such that a large portion of the energy associated with the backward traveling wave is absorbed by the attenuator while only a relatively small portion of energy associated with the forwarded traveling electromagnetic wave is absorbed.

Figure 2a shows a mass of material such as ferrite and vectors $H_0$, $m$ and $H_1$. For the purposes of this explanation, it will be assumed that a sample of ferromagnetic material is placed in a static unidirectional magnetic field having flux lines oriented in the direction of vector $H_0$. Due to the contribution of its many spinning electrons, the sample has a magnetic moment. The total magnetization vector $m$ has associated with it an angular momentum arising from the angular momenta of all of the spinning electrons contributing to the magnetization. Because of this angular momentum the magnetization vector behaves as a top or gyroscope. If it is displaced from its equilibrium position in a static unidirectional magnetic field, it will not rotate directly into alignment with the field but will precess in a particular direction about the static unidirectional magnetic field direction at an angular frequency $\omega$. The frequency $\omega$ is determined by a number of factors including the strength of the unidirectional magnetic field $H_0$. In the absence of damping, this precession would continue indefinitely, but damping losses in most ferrites are such that precessing is damped out in approximately $10^{-8}$ seconds. If an oscillating magnetic field $H_1(\omega)$ is applied at right angles to $H_0$, the magnetization vector is driven in precession. When the driving frequency $\omega$ is equal to the precessional frequency, energy is absorbed from the electromagnetic field.

Since a considerable amount of damping is present, resonance is not sharply defined at a particular frequency but is defined by a relatively broad curve over a frequency range. Typical values of Q, where Q is defined as $f/\Delta f$ at the half power point of the resonant curve, for conventional ferrite compositions, is in the order of 2. If, in addition, the oscillating magnetic field is circularly polarized in a plane substantially perpendicular to the static magnetic field in the ferrite, there is a transfer of energy for only one particular sense of rotation of the $H_1(\omega)$ vector. For the opposite sense of rotation, there is no coupling and consequently no resonance absorption of energy, i.e., energy is absorbed from the circularly polarized component rotating in the direction of natural precession of the magnetization vector.

In order to further amplify this description with regard to the effects of circularly polarized magnetic fields, attention is directed to Figures 2b and 2c of the drawing. The attenuating effect of this ferrite material may be defined by equation 1.

$$\alpha_b - \alpha_f = \Delta\alpha \tag{1}$$

in which $\alpha_f$ is the attenuation by ferrite material of a forward traveling wave, i.e., a wave having a circularly polarized magnetic field component rotating in a first direction, and $\alpha_b$ represents the attenuation of a backward traveling wave. Figure 2b illustrates a plane polarized wave which may be represented by vector 30. Vector 30 may be considered to be composed of two oppositely rotating vectors 31 and 32 rotating with equal but opposite angular velocities. The resultant is the vector 30 which goes from a positive value to a negative value in the same plane. The difference in attenuation for a forward traveling wave and a backward traveling wave when the waves are plane polarized and have no circular polarized components is substantially zero. The attenuation in either direction will be substantially the same and the magnitude of this attenuation will be a function of the frequency of the electromagnetic wave.

A circularly polarized wave may be defined and described as shown in Figure 2c of the drawing. Vector 33, which is rotating at an angular velocity $\omega$, is representative of a circularly polarized wave. In practice commonly obtainable magnetic fields associated with electromagnetic waves traveling in helices are elliptically polarized rather than circularly polarized; however, an elliptically polarized magnetic field may be represented by two vectors, a first vector 34 representative of a plane polarized wave and a second vector 33 rotating at an angular velocity $\omega$ representative of a circularly polarized wave, the combination of which results in an elliptically polarized wave. Therefore, it may be seen that directional attenuating effects may be obtained by utilizing an elliptically polarized time varying magnetic field in conjunction with a static unidirectional magnetic field.

The electromagnetic field associated with a wave propagating on a helix in free space may be defined mathematically by means of a series of equations. These equations are omitted from this specification in the interest of simplicity and clarity but are readily obtainable from mathematical texts on the effects and fields associated with electromagnetic waves propagated on helical structures. These equations show that the magnetic component of an electromagnetic wave propagated along a helix structure is elliptically polarized and rotates in a first direction within the helix and in an opposite direction outside of the helix. Therefore, a backward traveling wave on the helix will have an alternating magnetic vector $H_1(\omega)$ rotating in the opposite sense to that for a forward traveling wave so that the condition for absorption of more energy in one direction of wave propagation than in the reverse direction is satisfied.

It is apparent that in order to obtain satisfactory directional attenuation by means of ferromagnetic resonance in a traveling wave interaction device, it is necessary to have more ferromagnetic material coupled to the rotating field outside the helix than to the rotating field within the helix or the converse thereof. It is also apparent that the directional attenuating effect of the ferromagnetic material is greatest when the radio frequency electromagnetic wave in the ferromagnetic material is circularly polarized.

In view of the foregoing discussion, it is readily apparent that a helix traveling wave tube, such as that illustrated by way of example in Figure 1 of the drawing, represents a structure in which the conditions for ferromagnetic resonance absorption are easily satisfied. A static longitudinal field is an intrinsic part of the device and serves the primary purpose of keeping the electron stream together over a long path from the electron gun to the collector 14; however, this unidirectional longitudinal field which is used for focusing the electron beam may not be strong enough for satisfactory directional attenuation and, therefore, when this condition prevails an additional source of static unidirectional magnetic flux is necessary and may be provided by means of an additional solenoid or permanent magnetic material in structures which will be hereinafter described by way of example.

Although this description is directed to the condition in which the uniform unidirectional magnetic field is directed along the helix axis and the circularly polarized magnetic component of the electromagnetic wave propagated along the helix is considered to be perpendicular to the direction of this uniform magnetic field, it is noted that a mathematical analysis of the equations defining the electrical and magnetical fields about a helix on which an electromagnetic wave is being propagated indicates that directional attenuation is also obtainable with a static magnetic field in a direction symmetrically circular around the helix. Thus, it is apparent and considered to be within the scope of this invention to use symmetrically circular static magnetic fields or to superimpose static magnetic fields in both of these directions, i.e., along the axis of the helix and symmetrically circular about the circumference of the helix, in order to maximize the unidirectionality of attenuation due to the ferromagnetic resonance effect.

It is noted that the permeability of ferromagnetic material, when immersed in a static magnetic field, is different along each of the coordinate axes defining a volume of ferromagnetic material. Since the flux B is approximately equal to the product of the permeability $\mu$ and the magnetization H, it is apparent that the effective flux and, therefore, the effective shape of the magnetic field associated with the electromagnetic wave on the helix varies as a function of the permeability along any given axis of the ferromagnetic attenuator. Advantage is taken of this particular characteristic of ferromagnetic materials to obtain from the elliptically polarized magnetic field associated with a wave propagated on a helix in free space, a wave which is in effect a substantially circularly polarized radio frequency magnetic field in the region of the ferromagnetic attenuator; i.e., the extent to which circular polarization is obtained in the part of the electromagnetic wave traveling in the ferromagnetic material near the helical structure is a function of the helix configuration and of the effective radio frequency permeability of the ferromagnetic material. For this reason, the directional attenuating effects of ferromagnetic attenuators in close proximity to a helix traveling wave structure are considerably better than is indicated by the equations defining the magnetic fields about a helix in free space.

As a specific example of a traveling wave amplifier utilizing a directional attenuator including ferromagnetic material, attention is directed to Figure 1 of the drawing and to Figure 8 of the drawing. Helix 15 has the approximate dimensions 7/16 inch outside diameter with approximately 6 turns per inch. The helix is approximately six inches long and an accelerating voltage of approximately 4000 volts is provided by power supply 19. Attenuator cylinder 22 is constructed of ferromagnetic material having the approximate composition of 49.5% $Fe_2O_3$, 30.0% NiO, 20.0% ZnO and 0.5% $V_2O_5$. The attenuator consists of a cylinder approximately 7/16 inch inside diameter by 3/4 inch outside diameter by 11/16 inch long. A static axial magnetic field of approximately 1000 oersteds, oriented along the helix axis, is provided.

An inspection of the curves illustrated in Figure 8 of the drawing indicates that the forward and backward attenuation, i.e., the attenuation of the energy associated with forward and backward traveling waves, respectively, increases as the wave frequency increases. At each frequency, it is noted that the attenuation difference between the attenuation of the forward traveling wave and the attenuation of the backward traveling wave is in the order of 10 decibels. Attenuation ratios of backward to forward traveling waves in decibels in the order of six are obtainable with structures in accordance with this invention. It is noted that the attenuation in decibels of either a forward traveling wave or a backward traveling wave on a helix, such as helix 15 in Fig. 1, increases linearly as a function of the length of the attenuator. It is, therefore, apparent that the difference in attenuation of a forward traveling wave as compared to a backward traveling wave on such a helix will increase as a function of the effective length of the attenuator and that an attenuator structure may extend along any portion or all of the traveling wave structure.

Since the attenuating effects of the attenuators in accordance with this invention depend upon a ferromagnetic resonance effect, it is apparent that the attenuating effects are susceptible to the strength of the unidirectional magnetic field and the power and current handled by the traveling wave structure. The effect of the magnetic fields acting on the attenuator may be controlled by varying the shape of the attenuator structure, for example, by providing a slotted member or a plurality of ferromagnetic rods in proximity to the traveling wave structure. Alternatively, an attenuator structure including a number of types of ferromagnetic material is particularly suited for traveling wave amplifiers used over a specific frequency band or bands.

It is apparent that the presence of a ferromagnetic material in the region of and in close proximity to the helix structure will result in distortion of the unidirectional magnetic field which is used to focus the electron stream traveling from the cathode to the collector. A solution of this problem is to provide an attenuator with relatively low direct current magnetic permeability. This low direct current permeability must be obtained without materially affecting the high frequency characteristics of the ferromagnetic material. This may be accomplished, for example, by immersing ferromagnetic particles in any satisfactory plastic material such as polystyrene to obtain an effectively low direct current permeability while still maintaining the conditions necessary for high frequency directional attenuation.

A portion of an alternative structure embodying this invention is illustrated in Figure 3 of the drawing. Figure 3 shows helix 40, rings 41 including ferromagnetic material spaced by dielectric spacer rings 42 and enclosed by envelope 43. This construction results in an easily assembled apparatus which, when a static magnetic field is provided along the axis of the helix 40, presents a high attenuation to backward traveling waves along helix 40 and a relatively low attenuation to forward traveling waves along helix 40. It is apparent from the foregoing that similar satisfactory results are obtained by placing the attenuator rings 41 inside of the helix; however, in the interests of simplicity of design and simplicity of describing this invention only the modification with the ferromagnetic rings external to the helix is shown. The effective permeability to a static magnetic field is in part determined by the spacing between the attenuator rings which are illustrated as spaced with the same periodicity as the helix merely by way of example. The permeability of a structure such as that illustrated in Figure 3 is relatively low so that there is substantially no distortion of the direct current magnetic focusing field.

Figure 4 illustrates another modification of this invention in which the unidirectional magnetizing force is provided by a permanent magnetic member which is placed in the attenuator body proper. Figure 4 illustrates a helix 44, an enclosing envelope 45, a hollow toroidal-shaped member of ferromagnetic material 46 with permanent magnetic member 47, such as, for example, permanently magnetized iron-nickel alloy and a member of non-magnetic material or air gap 48. The hollow nature of the attenuator 46 results in little or no distortion of the axial magnetic focusing field. Permanent magnet 47 provides the uniform static magnetic flux which is necessary in order to obtain magnetic resonance effects in member 46. Permanent magnet 47 is provided with a north seeking pole at face 49 and a south seeking pole at face 50. A low permeability region is provided by a slot or holes at 48, which may be filled with non-magnetic material, to control the intensity of the unidirectional magnetic field by decreasing the permeability of the magnetic circuit. Since the directional attenuating effect occurs in the portion of the attenuator in close proximity to helix 44, the portion of member 46 adjacent to envelope 45 may be out of the magnetic field established by the traveling wave and, alternatively, consist of material having a bidirectional attenuating effect.

Figures 5 through 7 illustrate, by way of example, other adaptations of this invention to traveling wave interaction device structures and specifically to structures utilizing a helical slow wave structure. Figure 5 illustrates a bifilar helix consisting of helices 51 and 52, attenuator 53 and enclosing envelope 54.

Figure 6 illustrates still another adaptation of this invention to a helical traveling wave interaction device utilizing an annular electron stream. Figure 6 shows helix 55, ferromagnetic attenuator 56 enclosing envelope 57 and annular electron stream 58. As has been previously noted, directional attenuating effects are observed and will be obtained when the ferromagnetic material is placed either inside or external to a helical slow wave structure. It is considered within the scope of this invention to provide an attenuator or a plurality of attenuators of other than cylindrical shape. For example, attenuator 56 can be provided with a hole for use in a structure having a solid electron stream.

Figure 7 illustrates a double helix traveling wave device utilizing a ferromagnetic attenuator in accordance with this invention. Figure 7 illustrates inner helix 60 wound on dielectric rod 61 and enclosed in envelope 62. Helix 63 is wound externally on envelope 62 and ferromagnetic attenuator 64 is provided inside of and suitably bonded to envelope 62. In this form of helical traveling wave interaction device the electron stream is in the form of an annular stream of electrons 65. It is noted that in order for satisfactory directional attenuation to obtain, the attenuator structure must be substantially within the magnetic field associated with one of the helices and substantially outside the field associated with the other helix or, alternatively, helix 60 must be wound in a sense opposite to helix 63. This is apparent in view of the foregoing discussion in which it was pointed out that the circularly polarized magnetic field component associated with a wave traveling on a helix rotates on a first direction within the helix and in an opposite direction outside of the helix and that a plane polarized magnetic field is considered to be present in a region between the helices.

In view of the foregoing, it is apparent that directional attenuators utilizing materials displaying magnetic resonance effects and used in accordance with this invention may be utilized in any instance where there is present a static magnetic field and an electromagnetic wave having associated therewith a circularly polarized magnetic component rotating in a first direction in the case of a desired electromagnetic wave and in a substantially opposite direction in the case of an electromagnetic wave which it is desired to attenuate or absorb.

While the description of this invention has been confined to specific structures utilizing a helical slow wave structure in a traveling wave interaction device, it is readily apparent that this invention is not limited to the structures which are illustrated and described merely by way of example and it is intended to include all variations and modifications coming within the true spirit and scope of this invention.

What we claim as new and desire to secure by Letters Patent of the United States is:

A traveling wave interaction device comprising at least one slow wave structure for transmitting electromagnetic wave energy at a velocity of less than the velocity of light and means including an electron source for directing an electron beam in interacting relation with the wave energy transmitted by said structure, said structure providing an alternating magnetic field including a circularly polarized component rotating in a first direction when electromagnetic wave energy is propagated in a forward direction along said slow wave structure and rotating in opposite direction when electromagnetic wave energy is propagated in a backward direction, a hollow toroidal member of ferromagnetic attenuating material surrounding said slow wave structure to absorb a relatively small portion of the electromagnetic wave energy traveling in a forward direction on said structure and a relatively large portion of the wave energy traveling in a substantially backward direction on said structure, said toroidal member of ferromagnetic attenuating material including a member of permanently magnetized material and at least one low permeability region in the wall thereof.

References Cited in the file of this patent

UNITED STATES PATENTS

| | | |
|---|---|---|
| 2,452,529 | Snoek | Oct. 26, 1948 |
| 2,580,678 | Hansen et al. | Jan. 1, 1952 |
| 2,584,597 | Landauer | Feb. 5, 1952 |
| 2,588,832 | Hansell | Mar. 11, 1952 |
| 2,626,371 | Barnett et al. | Jan. 20, 1953 |
| 2,644,930 | Luhrs et al. | July 7, 1953 |
| 2,752,430 | Watkins | June 26, 1956 |
| 2,797,360 | Rogers et al. | June 25, 1957 |
| 2,798,203 | Robertson | July 2, 1957 |

OTHER REFERENCES

"The Microwave Gyrator," pages 22 to 26, Bell System Technical Journal for January 1952.

Article, "A Non Reciprocal Microwave Component," by Kales et al., published in Journal of Applied Physics, vol. 24, No. 6, June 1953, pages 816 and 817.